United States Patent
Hengesbach et al.

(10) Patent No.: US 12,516,181 B2
(45) Date of Patent: Jan. 6, 2026

(54) SULPHUR-CROSSLINKED RUBBER MIXTURE AND VEHICLE TIRE

(71) Applicant: Continental Reifen Deutschland GmbH, Hannover (DE)

(72) Inventors: Frank Hengesbach, Datteln (DE); Joseph Guardalabene, Hannover (DE); Thorsten Torbrügge, Langenhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 649 days.

(21) Appl. No.: 17/597,741

(22) PCT Filed: Jun. 17, 2020

(86) PCT No.: PCT/EP2020/066835
§ 371 (c)(1),
(2) Date: Jan. 21, 2022

(87) PCT Pub. No.: WO2021/013438
PCT Pub. Date: Jan. 28, 2021

(65) Prior Publication Data
US 2022/0259413 A1 Aug. 18, 2022

(30) Foreign Application Priority Data

Jul. 22, 2019 (EP) .................................... 19187552

(51) Int. Cl.
| | | |
|---|---|---|
| C08L 9/00 | (2006.01) | |
| B60C 17/00 | (2006.01) | |
| B60C 1/00 | (2006.01) | |

(52) U.S. Cl.
CPC ............ *C08L 9/00* (2013.01); *B60C 17/0009* (2013.01); *B60C 2001/0033* (2013.01)

(58) Field of Classification Search
CPC  C08L 9/00; B60C 17/0009; B60C 2001/0033
See application file for complete search history.

(56) References Cited

U.S. PATENT DOCUMENTS

| | | | | |
|---|---|---|---|---|
| 2008/0161475 A1* | 7/2008 | York | ...................... | C08K 9/06 524/493 |
| 2015/0283854 A1* | 10/2015 | Saintigny | ............ | B60C 11/0008 524/313 |
| 2017/0321033 A1* | 11/2017 | Barnicki | ............. | C01B 17/0232 |

FOREIGN PATENT DOCUMENTS

| | | | | |
|---|---|---|---|---|
| EP | 1526002 A1 * | 4/2005 | ........... | B60C 1/0016 |
| EP | 2727907 A1 * | 5/2014 | ........... | C07C 319/24 |
| EP | 2947116 A2 | 11/2015 | | |
| EP | 2952538 A1 * | 12/2015 | ............... | B60C 1/00 |
| EP | 3428225 A1 * | 1/2019 | ............... | C08K 3/30 |
| EP | 3428255 A1 | 1/2019 | | |

OTHER PUBLICATIONS

Santoflex 6PPD Product Technical Datasheet by Eastman Chemical (Year: 2019).*
Feldhues-538 German (Year: 2015).*
Feldhues-538 English (Year: 2015).*
Feldhues-907 German (Year: 2014).*
Feldhues-907 English (Year: 2014).*
Weber German (Year: 2019).*
Weber English (Year: 2019).*
Weinreich German (Year: 2005).*
Weinreich English (Year: 2005).*
Chinese Office Action dated Jan. 31, 2023 of counterpart CN application 2020800528374 claiming same PCT application which this application is based.
Measures for Improving Reversion Resistance of Off-road Machinery Tires / Jul. 25, 2005.
T.Kleiner, W•Jeske, W•Loreth /A new type of crosslinking agent to improve the thermal stability of rubber compounds / May 13, 2003.
K.G. Häusler, P. Zander, K.-F. Arndt, R.F.T. Stepto / DCS-Untersuchungen an ungequollenen vernetzten Polybutadienen—1986.
Verzeichnis der verwendeten Abkürzungen und Symbole.
International Search Report dated of international application PCT/EP2020/066835 on which this application is based.
European Search Report dated of European application 19187552.5 on which this application is based.
BR Office Action dated Jan. 3, 2025 of counterpart Brazilian Patent Application No. BR112022000030-8.

* cited by examiner

*Primary Examiner* — Robert S Jones, Jr.
*Assistant Examiner* — Joshua Caleb Bledsoe
(74) *Attorney, Agent, or Firm* — Richard A. Wolf; Gregory Adams

(57) ABSTRACT

A sulfur-crosslinked rubber mixture, in particular for vehicle tires, and a vehicle tire. The sulfur-crosslinked rubber mixture contains at least the following constituents:
- at least one diene rubber and
- 0.5 to 10.0 phr of at least one anti-reversion agent and
- 2.0 phr or more of at least one para-phenylenediamine and
- 2.0 phr or more of at least one dihydroquinoline and wherein the network node spacing of the crosslinked rubber mixture is 4.5 to 10 nm.

24 Claims, No Drawings

SULPHUR-CROSSLINKED RUBBER MIXTURE AND VEHICLE TIRE

The invention relates to a sulfur-crosslinked rubber mixture, in particular for vehicle tires, and to a vehicle tire.

It is known that motor vehicle tires comprise constituents that distinctly slow the aging and oxidation of the rubbers and other constituents present and hence have a positive effect on durability over a relatively long lifetime of the tire.

However, especially for retreading of vehicle tires, there remains a need to further optimize their durability; severe heating during the tire lifetime, such as during braking, causes vehicle tires to age more rapidly. Furthermore, vehicle tires from regions with elevated ambient temperatures or demanding topography or other severe demands, for example long-term operation under high load, are also to be made amenable to retreading or further optimized therefor. In addition, as a consequence of production, during vulcanization of the green tire some components are heated for longer than is optimal based on the crosslinking profile of the respective mixture, i.e. the rubber mixture goes back into reversion, that is to say decomposition of the network formed by the vulcanization, after vulcanization has taken place.

It is accordingly an object of the present invention to provide a sulfur-crosslinked rubber mixture which exhibits improved reversion stability and improved cracking properties, in particular after aging.

This object is achieved by a sulfur-crosslinked rubber mixture as claimed in claim 1.

Through the combination of the recited constituents and the network node spacing of 4.5 to 10 nm the sulfur-crosslinked rubber mixture according to the invention exhibits markedly better reversion stability and improved cracking properties, in particular after aging.

The present invention further provides a vehicle tire comprising the sulfur-crosslinked rubber mixture in at least one component.

The vehicle tire according to the invention exhibits improved durability and optimized retreadability.

The vehicle tire may also comprise the sulfur-crosslinked rubber mixture in more than one component.

It preferably comprises the sulfur-crosslinked rubber mixture at least in the flange profile, the bead apex, a reinforcing ply and/or the tread. In the case of two-part treads (upper part: cap and lower part: base), the rubber mixture according to be the invention may be used both for the cap and for the base. It is preferable when at least the cap comprises at least one sulfur-crosslinked rubber mixture according to the invention.

The vehicle tire of the invention particularly preferably comprises the sulfur-crosslinked rubber mixture at least in the flange profile. Especially the flange profile is in operation subject to severe dynamic loads and subjected to aging through heat exposure from inside (for example brakes) and outside. There is at the same time a great need to optimize the reversion stability of the flange profile to compensate difficulties from the production process of the vehicle tire.

A "sulfur-crosslinked rubber mixture" is to be understood as meaning a rubber mixture produced from a ready-to-use rubber mixture (or a rubber raw mixture) by sulfur vulcanization. A sulfur-crosslinked rubber mixture is thus a vulcanizate.

Within the context of the present invention, "vehicle tires" are to be understood to mean pneumatic vehicle tires and solid rubber tires, including tires for industrial and construction site vehicles, truck, car and two-wheeled-vehicle tires.

The rubber mixture according to the invention is moreover also suitable for other components of vehicle tires, for example in particular any other internal tire components or the sidewall. Moreover, the rubber mixture of the invention is also suitable for other industrial rubber articles, such as bellows, conveyor belts, air springs, belts, drive belts or hoses, and also footwear soles.

The constituents of the sulfur-crosslinked rubber mixture according to the invention are more particularly described hereinbelow. All elucidations also apply to the vehicle tire according to the invention which includes at least one rubber mixture according to the invention in at least one component. The description of the individual constituents relates to the rubber mixture before vulcanization, i.e. the sulfur-crosslinked rubber mixture, unless otherwise stated. It is apparent to those skilled in the art that the constituents (may) be present in a different form after vulcanization and this applies in particular to the rubbers (polymers), sulfur and further constituents involved in the vulcanization.

The unit "phr" (parts per hundred parts of rubber by weight) used in this document is the standard unit of quantity for mixture recipes in the rubber industry. In this document, the dosage of the parts by weight of the individual substituents is based on 100 parts by weight of the total mass of all rubbers present in the mixture that have a molecular weight $M_w$ by GPC of greater than 20 000 g/mol.

The weight-average molecular weight Mw is determined by means of gel permeation chromatography (GPC with tetrahydrofuran (THF) as eluent at 40° C., PPS apparatus, calibrated with polystyrene standard; size exclusion chromatography (SEC) in accordance with BS ISO 11344:2004).

In the context of the present invention, the abbreviation Mw is used for the weight-average molecular weight.

The expression phf (parts per hundred parts of filler by weight) used in this text is the conventional unit of quantity for coupling agents for fillers in the rubber industry.

The reported amounts of the constituents in each case relate to the form in which the constituent is commercially available or typically employed in the production of the rubber mixture unless otherwise stated.

According to the invention the rubber mixture is sulfur-crosslinked and to this end comprises at least one diene rubber, wherein the rubber mixture may comprise one diene rubber or a mixture of two or more different diene rubbers.

Diene rubbers are rubbers which are formed by polymerization or copolymerization of dienes and/or cycloalkenes and thus have C=C double bonds either in the main chain or in the side groups.

The diene rubber is preferably selected from the group consisting of natural polyisoprene (NR), synthetic polyisoprene (IR), epoxidized polyisoprene (ENR), butadiene rubber (BR), butadiene-isoprene rubber, solution-polymerized styrene-butadiene rubber (SSBR), emulsion-polymerized styrene-butadiene rubber (ESBR), styrene-isoprene rubber, liquid rubbers having a molecular weight $M_w$ of more than 20 000 g/mol, halobutyl rubber, polynorbornene, isoprene-isobutylene copolymer, ethylene-propylene-diene rubber, nitrile rubber, chloroprene rubber, acrylate rubber, fluororubber, silicone rubber, polysulfide rubber, epichlorohydrin rubber, styrene-isoprene-butadiene terpolymer, hydrogenated acrylonitrile butadiene rubber and hydrogenated styrene-butadiene rubber.

Nitrile rubber, hydrogenated acrylonitrile-butadiene rubber, chloroprene rubber, butyl rubber, halobutyl rubber and/or ethylene-propylene-diene rubber in particular are used in the production of industrial rubber articles, such as belts, drive belts and hoses, and/or footwear soles. The mixture compositions known to those skilled in the art for these rubbers, which are specific in terms of fillers, plasticizers, vulcanization systems and additives, are preferably employed.

The natural and/or synthetic polyisoprene of all embodiments may be either cis-1,4-polyisoprene or 3,4-polyisoprene. However, the use of cis-1,4-polyisoprenes having a cis-1,4 proportion of >90% by weight is preferred. Such a polyisoprene is firstly obtainable by stereospecific polymerization in solution with Ziegler-Natta catalysts or using finely divided lithium alkyls. Secondly, natural rubber (NR) is one such cis-1,4-polyisoprene, for which the cis-1,4 content in the natural rubber is greater than 99% by weight.

A mixture of one or more natural polyisoprenes with one or more synthetic polyisoprenes is further also conceivable.

In the context of the present invention the term "natural rubber" is to be understood as meaning naturally occurring rubber which may be obtained from Hevea rubber trees and from "non-Hevea" sources. Non-Hevea sources include for example Guayule shrubs and dandelion such as for example TKS (Taraxacum kok-saghyz; Russian dandelion).

If the rubber mixture of the invention contains butadiene rubber (i.e. BR, polybutadiene), this may be any of the types known to those skilled in the art. These include inter alia the so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li—BR (lithium-catalyzed butadiene rubber) having a cis content of 20% to 50% by weight. Particularly good properties and low hysteresis of the rubber mixture are achieved with a high-cis BR.

The polybutadiene(s) employed may be end group-modified with modifications and functionalizations and/or be functionalized along the polymer chains. The modification may be selected from modifications with hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, other modifications known to those skilled in the art, also known as functionalizations, are also suitable. Metal atoms may be a constituent of such functionalizations.

In the case where at least one styrene-butadiene rubber (styrene-butadiene copolymer) is present in the rubber mixture, this may be selected from solution-polymerized styrene-butadiene rubber (SSBR) and emulsion-polymerized styrene-butadiene rubber (ESBR), a mixture of at least one SSBR and at least one ESBR also being employable. The terms "styrene-butadiene rubber" and "styrene-butadiene copolymer" are used synonymously in the context of the present invention.

The styrene-butadiene copolymer used may be end group-modified and/or functionalized along the polymer chains with the modifications and functionalizations recited above for the polybutadiene.

The at least one diene rubber is preferably selected from the group consisting of natural polyisoprene (NR, natural rubber), synthetic polyisoprene (IR), butadiene rubber (BR), solution-polymerized styrene-butadiene rubber (SSBR), emulsion-polymerized styrene-butadiene rubber (ESBR), butyl rubber (IIR) and halobutyl rubber.

In a particularly preferred embodiment of the invention the at least one diene rubber is selected from the group consisting of natural polyisoprene (NR), synthetic polyisoprene (IR), butadiene rubber (BR), solution-polymerized styrene-butadiene rubber (SSBR) and emulsion-polymerized styrene-butadiene rubber (ESBR). A rubber mixture of this kind is especially suitable for the outer components of vehicle tires.

In a very particularly preferred embodiment of the invention the at least one diene rubber is selected from the group consisting of natural polyisoprene (NR), synthetic polyisoprene (IR) and butadiene rubber (ESBR). A polymer system composed of one or more or the recited rubbers achieves the object of the invention particularly well; in particular good abrasion resistance, tensile strength and resistance to fatigue cracking coupled with low hysteresis/low heat buildup resulting from the rubber mixture are achieved.

In a particularly advantageous embodiment of the invention the rubber mixture comprises at least one natural polyisoprene (NR), preferably in amounts of 20 to 55 phr, and in one particularly advantageous embodiment of the invention 20 to 40 phr, very particularly preferably 25 to 35 phr. Such a rubber mixture exhibits good processability and reversion stability and—in particular in the flange profile of vehicle tires—optimized cracking properties, in particular after aging.

In a particularly advantageous embodiment of the invention the rubber mixture comprises at least one polybutadiene (BR, butadiene rubber), preferably in amounts of 45 to 80 phr, particularly preferably 50 to 80 phr, and in a particularly advantageous embodiment of the invention 60 to 80 phr, in particular 65 to 75 phr. This achieves particularly good cracking properties coupled with a higher reversion stability and higher resistance to heat-mediated aging of the rubber mixture according to the invention.

It is preferable when the sulfur-crosslinked rubber mixture contains at least one filler preferably in amounts of 30 to 400 phr, particularly preferably 30 to 200 phr, in turn preferably 50 to 100 phr.

The filler may in principle be any of the fillers known to those skilled in the art for rubber mixtures. In advantageous embodiments of the invention the filler is a reinforcing filler which is preferably selected from the group consisting of carbon blacks and silicas.

The silica may be any of the silica types known to those skilled in the art that are suitable as filler for tire rubber mixtures, such as in particular precipitated silicas.

It is, for example, possible to use a finely divided precipitated silica which has a nitrogen surface area (BET surface area) (in accordance with DIN ISO 9277 and DIN 66132) of 35 to 400 $m^2/g$, preferably of 35 to 350 $m^2/g$, particularly preferably of 85 to 320 $m^2/g$ and very particularly preferably of 120 to 235 $m^2/g$, and a CTAB surface area (in accordance with ASTM D 3765) of 30 to 400 $m^2/g$, preferably of 30 to 330 $m^2/g$, particularly preferably of 80 to 300 $m^2/g$ and very particularly preferably of 115 to 200 $m^2/g$. Such silicas lead, for example in rubber mixtures for tire treads, to particularly good physical properties of the vulcanizates. Advantages in mixture processing by way of a reduction in mixing time can also result here while retaining the same product properties, leading to improved productivity. Silicas used may thus, for example, be either those of the Ultrasil® VN3 type (trade name) from Evonik or highly dispersible silicas known as HD silicas (e.g. Zeosil® 1165 MP from Solvay).

The terms "silicic acid" and "silica" are used synonymously in the context of the present invention.

Suitable carbon blacks include all carbon black types known to those skilled in the art, such as in particular the ASTM carbon blacks according to ASTM D 1765.

In one embodiment the carbon black has an iodine number according to ASTM D 1510, also known as the iodine adsorption number, between 30 and 250 g/kg, preferably 30 to 180 g/kg, particularly preferably 40 to 180 g/kg, and very particularly preferably 40 to 130 g/kg, and a DBP number according to ASTM D 2414 of 30 to 200 ml/100 g, preferably 70 to 200 ml/100 g, particularly preferably 90 to 200 ml/100 g.

The DBP number according to ASTM D 2414 determines the specific absorption volume of a carbon black by means of dibutyl phthalate.

In a preferred embodiment of the invention at least one carbon black having an iodine adsorption number according to ASTM D 1510 of 80 to 100 g/kg and a DBP number to ASTM D 2414 of 115 to 127 mL/100 g is used.

The use of such a type of carbon black in the rubber mixture, in particular for vehicle tires, ensures the best possible compromise between reinforcing and damping effect and thus between cracking properties and the ecologically relevant roll resistance.

The amount of carbon black present is preferably 45 to 100 phr, in particular 60 to 85 phr.

Preference is given here to only one type of carbon black being used in the respective rubber mixture, but it is also possible to mix various types of carbon black into the rubber mixture.

Further non-reinforcing fillers include for example aluminosilicates, kaolin, chalk, starch, magnesium oxide, titanium dioxide, or rubber gels and also fibers (for example aramid fibers, glass fibers, carbon fibers, cellulose fibers).

Further, optionally reinforcing, fillers are for example carbon nanotubes ((CNTs), including discrete CNTs, hollow carbon fibers (HCF) and modified CNTs containing one or more functional groups such as hydroxy, carboxy and carbonyl groups), graphite and graphene and what is known as "carbon-silica dual-phase filler".

In the context of the present invention zinc oxide is not included among the fillers.

The sulfur-crosslinked rubber mixture according to the invention contains 2.0 phr or more of at least one para-phenylenediamine, wherein one or more different para-phenylenediamines may be employed.

The substance class of the para-phenylenediamines is known to those skilled in the art as an aging stabilizer.

The amount of para-phenylenediamines present is preferably 2.0 to 7 phr, particularly preferably 3.0 to 7.0 phr, in turn preferably 3.0 to 6.0 phr, wherein in the case of a mixture of two or more para-phenylenediamines the recited amounts are total amounts.

The para-phenylenediamine may be selected from any substances known to those skilled in the art, such as N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), phenyl[4-({[4-({[4-(phenylamino)phenyl]amino}ethyl)phenyl]ethyl}amino)phenyl]amine, phenyl{4-[2-{[4-(phenylamino)phenyl]amino}ethyl)amino]phenyl}amine, (1-methyl-2-{[-(phenylamino)phenyl]amino}propyl) [4-(phenylamino)phenyl]amine, N-(1,3-dimethylbutyl)-N'-(4-cumylphenyl)-p-phenylenediamine, N,N'-di(1,4dimethylpentyl)-p-phenylenediamine (77PD), N,N'-di(1-ethyl, 4-methyl-hexyl)-p-phenylenediamine (88PD), N,N'-bis(1-ethyl-3-methylpentyl)-p-phenylenediamine (DOPD) and N,N'-di-β-naphthyl-p-phenylenediamine (DNPD).

It is preferable when the para-phenylenediamine is selected from the group consisting of N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD).

In a particularly advantageous embodiment of the invention the para-phenylenediamine is selected from the group consisting of N-phenyl-N'-(1,3-dimethylbutyl)-p-phenylenediamine (6PPD) and N,N'-ditolyl-p-phenylenediamine (DTPD).

The object of the invention is achieved particularly well by the preferably selected para-phenylenediamines.

The sulfur-crosslinked rubber mixture according to the invention contains 2.0 phr or more of at least one dihydroquinoline, wherein one or more different dihydroquinolines may be employed. Dihydroquinolines are known to those skilled in the art as aging stabilizers.

The amount of dihydroquinolines present is preferably 2.0 to 10 phr, particularly preferably 2.75 to 10 phr, in turn preferably 3.5 to 10 phr, very particularly preferably 3.8 to 10 phr and in turn very particularly preferably 3.8 to 8 phr. In the case of a mixture of two or more different dihydroquinolines the reported amounts relate to the total amounts of dihydroquinolines.

The dihydroquinoline is preferably selected from the group consisting of 2,2,4-trimethyl-1,2-dihydroquinoline (TMQ) and 6-ethoxy-2,2,4-trimethyl-1,2-dihydroquinoline (ETMQ).

In a particularly advantageous embodiment of the invention the dihydroquinoline is 2,2,4-trimethyl-1,2-dihydroquinoline (TMQ).

The object of the invention is achieved particularly well by the preferably selected dihydroquinolines.

The rubber mixture according to the invention is sulfur-crosslinked.

The terms "vulcanized" and "crosslinked" are used synonymously in the context of the present invention.

The sulfur-crosslinked rubber mixture according to the invention contains 0.5 to 10 phr, preferably 0.5 to 8 phr, of at least one anti-reversion agent.

In advantageous embodiments of the invention the sulfur-crosslinked rubber mixture contains 0.7 to 8.0 phr of at least one anti-reversion agent.

In a particularly advantageous embodiment of the invention the sulfur-crosslinked rubber mixture contains 0.8 to 6.0 phr of at least one anti-reversion agent.

The recited amounts of the at least one anti-reversion agent in each case relate—as also elucidated at the outset—to the substances as added during production of the rubber mixture, i.e. still to the uncrosslinked state.

In advantageous embodiments the recited amounts of the at least one anti-reversion agent in each case relate to one anti-reversion agent since according to the invention at least one anti-reversion agent is subject to the condition that it is present in amounts of 0.5 to 10 phr.

In the advantageous embodiments further substances likewise having an anti-reversion agent effect may also be present in other amounts.

The total amount of substances having an anti-reversion agent effect is preferably 0.5 to 12 phr, particularly preferably 0.5 to 10 phr.

Anti-reversion agents are known to those skilled in the art. These are substances which retard decomposition of the polymer network system formed by the vulcanization through further heat exposure.

Those skilled in the art are further aware that this is effected by different reaction mechanisms according to the employed anti-reversion agent with the objective of inhibiting at least one of the two parallel reactions primarily responsible for reversion and/or repairing destroyed parts of the polymer network system by substitution. A number of the anti-reversion agents known to those skilled in the art form monosulfidic network bridges and others form hybrid network bridges where during vulcanization a moiety of the anti-reversion agent is incorporated into the sulfur bridges between the polymer chains thus resulting in a more stable monosulfidic or hybrid network. Others in turn preferably form new crosslinks under Diels-Alder reaction conditions between conjugated unsaturated polymer constituents typically formed by modification at the polymer main chain during the reversion.

According to the invention the anti-reversion agent may be any of the substances or substance classes known to those skilled in the art which have one of the described effects in a sulfur-crosslinked rubber mixture.

It is preferable when the anti-reversion agent is selected from the group consisting of substances which construct monosulfidic or hybrid network bridges and especially selected from the group consisting of thiuram accelerators and derivatives thereof, dithiocarbamate accelerators and derivatives thereof, bisthiosulfate compounds and salts thereof.

It is particularly preferable when the anti-reversion agent is selected from the group consisting of
1,6-bis(N,N-dibenzylthiocarbamoyldithio)hexane, hexamethylene-1,6-bis(thiosulfate) disodium salt dihydrate and tetrabenzylthiuramdisulfide (TBzTD).

The substance 1,6-bis(N,N-dibenzylthiocarbamoyldithio)hexane is also available under the trade name "Vulcuren®".

The substance hexamethylene-1,6-bis(thiosulfate) sodium salt dihydrate is also available under the trade name "Duralink™ HTS" from Eastman Chemical Company.

In particularly preferred embodiments of the invention the anti-reversion agent is selected from the group consisting of 1,6-bis(N,N-dibenzylthiocarbamoyldithio)hexane and hexamethylene-1,6-bis(thiosulfate) disodium salt dihydrate In a very particularly advantageous and exemplary embodiment the anti-reversion agent is 1,6-bis(N,N-dibenzylthiocarbamoyldithio)hexane.

The reported amounts of the at least one anti-reversion agent relate in each case to the form in which it is commercially available and employed in the production of the rubber mixture.

According to the invention the network node spacing of the crosslinked rubber mixture is 4.5 to 10 nm, preferably 4.75 to 8 nm and particularly preferably 5.25 to 7 nm. In combination with the recited constituents this achieves an optimization of the cracking properties, in particular after aging, and improved reversion stability.

The network node spacing of the crosslinked rubber mixture is determined by differential scanning calorimetry as described below.

When the network node spacing in the crosslinked rubber mixture according to the invention is greater than 10 nm hysteresis properties are impaired and hardness and stiffness fall to a too low level.

When the network node spacing in the crosslinked rubber mixture according to the invention is less than 4.5 nm, cracking properties are impaired.

The network node spacing is especially and preferably adjusted via the type and amount of employed vulcanization chemicals, in particular anti-reversion agents and optionally sulfur and/or sulfur donors and optionally vulcanization accelerators.

Generally: Network Node Spacing Via a Defined Number of Sulfur Atoms in the Network To this end, in a preferred embodiment before vulcanization the rubber mixture contains a vulcanization system capable of providing 0.01 to 0.14 mol per 100 phr of diene rubber (mhr),
preferably 0.01 to 0.040 mhr, very particularly preferably 0.01 to 0.025 mhr,
of sulfur atoms for the network.

In an advantageous embodiment the sulfur-crosslinked rubber mixture according to the invention is thus based on a vulcanization system through which 0.01 to 0.14 mol per 100 phr of diene rubber (mhr),
preferably 0.01 to 0.040 mhr, very particularly preferably 0.01 to 0.025 mhr,
of sulfur atoms are incorporated into the network.

The molar amount of sulfur includes all sulfur atoms incorporated into the network even if they are not intermediately liberated separately as such; this applies in particular to moieties —S-radical-S— which derive from anti-reversion agents—such as for example 1,6-bis(N,N-dibenzylthiocarbamoyldithio)hexane (Vulcuren®)—and are incorporated in the network between the polymer chains. The recited moiety —S-radical-S— provides 2 sulfur atoms. The sulfur may further derive from sulfur added in elemental form or sulfur donors (sulfur-donating substances). The sulfur provided by the substance tetrabenzylthiuramdisulfide (TBzTD) optionally contained as anti-reversion agent is then also included in the molar amount of sulfur.

The network node spacing may be effected solely through the addition of anti-reversion agents and optionally sulfur and/or sulfur donors. The addition of further accelerators is not absolutely necessary but likewise conceivable.

EMBODIMENT 1

Network Node Spacing Via 1,6-bis(N,N-dibenzylthiocarbamoyldithio)hexane as the Sole Vulcanization Chemical To this end, in a preferred embodiment before vulcanization the rubber mixture contains a vulcanization system comprising 1,6-bis(N,N-dibenzylthiocarbamoyldithio)hexane (Vulcuren®) as the sole vulcanization chemical, wherein the rubber mixture contains 1,6-bis(N,N-dibenzylthiocarbamoyldithio)hexane preferably in amounts of 4.0 phr to 10.0 phr, particularly preferably 6.0 to 9.0 phr.

EMBODIMENT 2

Network Node Spacing Via an Efficient Vulcanization System Composed of Sulfur and Further Vulcanization Accelerator In a further preferred embodiment before vulcanization the rubber mixture contains a vulcanization system which in addition to the inventive anti-reversion agent comprises
at least one (further) accelerator and sulfur. The term "further accelerator" is here to be understood as meaning all vulcanization accelerators known to the person skilled in the art not added to the still uncrosslinked rubber mixture as anti-reversion agent present according to the invention.

The further accelerator is preferably selected from the group consisting of thiazole accelerators, mercapto accelerators, sulfenamide accelerators, thiophosphate accelerators, thiourea accelerators, xanthate accelerators and guanidine accelerators.

Substances which can have an accelerating action and which may already be present as anti-reversion agents, such as in particular tetrabenzylthiuramdisulfide (TBzTD), are in the context of the present invention not included among the further accelerators.

The further accelerator is particularly preferably selected from the group consisting of sulfenamide accelerators and guanidine accelerators.

It is preferable when at least one sulfenamide accelerator preferably selected from the group consisting of N-cyclohexyl-2-benzothiazolesulfenamide (CBS), N,N-dicyclohexylbenzothiazole-2-sulfenamide (DCBS), benzothiazyl-2-sulfenomorpholide (MBS) and N-tert-butyl-2-benzothiazylsulfenamide (TBBS) is present.

It is particularly preferable when at least N-tert-butyl-2-benzothiazylsulfenamide (TBBS) is present as a further accelerator.

In this preferred embodiment comprising at least one further accelerator preferably 0.1 to 0.5 mol of accelerator per mol of sulfur atoms provided for the network, particularly preferably 0.25 to 0.4 mol of accelerator per mol of sulfur atoms provided for the network, (see above) of further accelerator is present in the still unvulcanized rubber mixture.

Such a vulcanization system is also referred to as an efficient vulcanization system. The molar amount of accelerator is relatively high compared to the amount of sulfur and increased amounts of monosulfidic sulfur bridges are formed between the polymer chains during crosslinking.

In this embodiment comprising at least one further accelerator and sulfur the amount of anti-reversion agent is preferably 0.5 to 4 phr, particularly preferably 0.5 to 3 phr, in turn preferably 0.5 to 2 phr.

Here too, the anti-reversion agent is preferably selected from the abovementioned groups and according to the preferred, particularly preferred and very particularly preferred etc. embodiments.

In a very particularly advantageous embodiment said agent is here too 1,6-bis(N,N-dibenzylthiocarbamoyldithio) hexane and/or hexamethylene-1,6-bis(thiosulfate) disodium salt dihydrate, in particular 1,6-bis(N,N-dibenzylthiocarbamoyldithio)hexane.

In this embodiment of the invention too, the sulfur may be provided via sulfur added in elemental form and/or via sulfur-donating substances. Here too, the sulfur incorporated into the network from substances such as Vulcuren® is included in the calculation as described above.

In the context of the present invention employable sulfur-donating substances (sulfur donors) include generally and in the abovementioned embodiments all sulfur donating substances known to those skilled in the art, also including sulfur-donating silanes, such as 3,3'-bis(triethoxysilylpropyl)tetrasulfide (TESPT). The calculation of the molar amount of sulfur must then take into account how many sulfur atoms in each case take part in the polymer-sulfur network formed by the vulcanization. For instance, 1 mol of 3,3'-bis(triethoxysilylpropyl)tetrasulfide (TESPT) provides 2 mol of sulfur atoms for the network.

Vulcanization retarders may also be present in the rubber mixture.

The rubber mixture can further contain customary additives in customary parts by weight which are added preferably in at least one base-mixing stage during the production of said mixture. These additives include a) plasticizer,
b) activators, for example zinc oxide and fatty acids (e.g. stearic acid) and/or other activators, such as zinc complexes, for example zinc ethylhexanoate,
c) waxes,
d) hydrocarbon resins, in particular adhesive resins
e) masticating aids, for example 2,2'-dibenzamidodiphenyl disulfide (DBD), and
f) processing aids, such as in particular fatty acid esters and metal soaps, for example zinc soaps and/or calcium soaps,
g) activators and/or agents for binding of fillers, in particular silica, for example silane coupling agents,
h) in addition to the aging stabilizers according to the invention other (further) aging stabilizers not included among the aging stabilizers present according to the invention.

The rubber mixture according to the invention may contain at least one silane coupling agent, preferably in amounts of 1 to 22 phf, preferably 5 to 15 phf. The expression phf (parts per hundred parts of filler by weight) used in this text is the conventional unit of quantity for coupling agents for fillers in the rubber industry. In the context of the present application, phf relates to the silica present, meaning that any other fillers present, such as carbon black, are not included in the calculation of the amount of silane.

The silane coupling agents may be any of the types known to those skilled in the art.

Furthermore, one or more different silane coupling agents may be used in combination with one another. The rubber mixture may thus contain a mixture of different silanes.

The silane coupling agents react with the surface silanol groups of the silica or other polar groups during the mixing of the rubber/the rubber mixture (in situ) or in the context of a pretreatment (premodification) even before addition of the filler to the rubber.

Coupling agents known from the prior art are bifunctional organosilanes having at least one alkoxy, cycloalkoxy or phenoxy group as a leaving group on the silicon atom and having as another functionality a group which, possibly after cleavage, can enter into a chemical reaction with the double bonds of the polymer. The latter group may for example be the following chemical groups:

—SCN, —SH, —NH$_2$ or —S$_x$— (with x=2 to 8).

Employable silane coupling agents thus include for example 3-mercaptopropyltriethoxysilane, 3-thiocyanatopropyltrimethoxysilane or 3,3'-bis(triethoxysilylpropyl) polysulfides having 2 to 8 sulfur atoms, for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT may for example also be added as a mixture with carbon black (trade name X50S® from Evonik).

Blocked mercaptosilanes as known for example from WO 99/09036 may also be used as a silane coupling agent. It is also possible to use silanes as described in WO 2008/083241 A1, WO 2008/083242 A1, WO 2008/083243 A1 and WO 2008/083244 A1. It is also possible to use, for example, silanes which are marketed under the name NXT in a number of variants from Momentive, USA, or those which are marketed under the name VP Si 363® by Evonik Industries.

The plasticizers used in the context of the present invention include all plasticizers known to those skilled in the art such as aromatic, naphthenic or paraffinic mineral oil plasticizers, for example MES (mild extraction solvate) or RAE (residual aromatic extract) or TDAE (treated distillate aromatic extract) or rubber-to-liquid oils (RTL) or biomass-to-liquid oils (BTL), preferably having a content of polycyclic aromatics of less than 3% by weight according to method IP 346 or rapeseed oil or in particular resin acids or factices or liquid polymers having a mean molecular weight (determination by GPC=gel permeation chromatography as per BS ISO 11344:2004) between 500 and 20 000 g/mol. If additional liquid polymers are used as plasticizers in the rubber mixture of the invention these are not included as rubber in the calculation of the composition of the polymer matrix.

The plasticizer is preferably selected from the group consisting of the abovementioned plasticizers.

The plasticizer is particularly preferably selected from the group consisting of liquid polymers and mineral oils.

When using mineral oil this is preferably selected from the group consisting of DAE (distilled aromatic extracts) and/or RAE (residual aromatic extract) and/or TDAE (treated distillate aromatic extracts) and/or MES (mild extracted solvents) and/or naphthenic oils.

In advantageous embodiments the rubber mixture according to the invention contains 0.5 to 8 phr, particularly preferably 1 to 5 phr, of at least one tackifying resin. Tackifying resins used may be natural or synthetic resins, such as hydrocarbon resins, that act as tackifiers. The hydrocarbon resins may be phenolic, aromatic or aliphatic. The tackifying resins are preferably selected from the group consisting of rosins and esters thereof, terpene-phenol resins, alkyne-phenol resins, phenolic resins and coumarone-indene resins, and phenolic resins are of particularly good suitability for the present invention.

The total amount of further additives is 3 to 150 phr, preferably 3 to 100 phr and particularly preferably 5 to 80 phr.

Zinc oxide (ZnO) may be included in the total proportion of further additives in the abovementioned amounts.

This may be any type of zinc oxide known to those skilled in the art, for example ZnO granules or powder. The zinc oxide conventionally used generally has a BET surface area of less than 10 $m^2/g$. However, it is also possible to use a zinc oxide having a BET surface area of 10 to 100 $m^2/g$, for example so-called "nano zinc oxides".

The rubber mixture of the invention is produced by processes which are customary in the rubber industry and in which a base mixture comprising all constituents apart from the vulcanization system (sulfur and vulcanization-influencing substances) is firstly produced in one or more mixing stages. The finished mixture is produced by adding the vulcanization system in a final mixing stage. The finished mixture is processed further, for example, by an extrusion operation and converted to the appropriate shape.

This is followed by further processing by vulcanization, wherein sulfur crosslinking takes place due to the vulcanization system added within the context of the present invention.

The above-described rubber mixture of the invention is particularly suitable for use in vehicle tires, especially pneumatic vehicle tires. Use in all tire components is conceivable in principle, in particular in a component such as the flange profile, a reinforcing ply, the bead apex and/or the tread, in particular in the cap of a tread having a cap/base construction.

In the context of the present invention the term "reinforcing ply" is in principle to be understood as meaning any reinforcing ply in a vehicle tire which comprises at least one crosslinked rubber mixture. In particular the component is a crescent-shaped reinforcing ply as especially arranged in the sidewall region in runflat tires.

For use in vehicle tires the mixture, as a finished mixture prior to vulcanization, is for example and preferably shaped into a flange profile and during production of the green vehicle tire applied in the known manner.

The production of the rubber mixture according to the invention for use in other components in vehicle tires is carried out as described above. The difference lies in the shaping after the extrusion operation/the calendering of the mixture. The thus obtained shapes of the still unvulcanized rubber mixture for the tread, the sidewall or one or more different body mixtures for example are then used for construction of a green tire.

"Body mixture" refers here to the rubber mixtures for the inner components of a tire, such as essentially the squeegee, inner liner (inner layer), core profile, belt, shoulder, belt profile, carcass, bead reinforcement, bead profile and bandage. For use of the rubber mixture of the invention in drive belts and other belts, especially in conveyor belts, the extruded, as-yet unvulcanized mixture is brought into the appropriate shape and often provided at the same time or subsequently with strength members, for example synthetic fibers or steel cords. This usually affords a multiply construction consisting of one and/or more plies of rubber mixture, one and/or more plies of identical and/or different strength members and one and/or more further plies of the same and/or another rubber mixture.

The invention shall now be more particularly elucidated with reference to comparative and exemplary examples summarized in the following table. The comparative mixtures are labeled C, and the inventive mixture E, in the Table. Throughout the text of the specification, the comparative mixtures are referred to as V1 to V4, which correspond with C1 to C4, respectively, in the Table.

The mixtures were produced by the method customary in the rubber industry under standard conditions in two stages in a laboratory mixer with a volume of 300 milliliters to 3 liters, in which, in the first mixing stage (base-mixing stage), all constituents apart from the vulcanization system (sulfur and vulcanization-influencing substances) were first mixed at 145 to 175° C., with target temperatures of 152 to 167° C., for 200 to 600 seconds. Addition of the vulcanization system in the second stage (final mixing stage) resulted in the preparation of the final mixture, with mixing at 90 to 120° C. for 180 to 300 seconds.

All mixtures were used to produce test specimens by vulcanization for 15 minutes under pressure at 160° C. and these test specimens were used to determine material properties typical for the rubber industry with the test methods specified hereinbelow.

Network node spacing according to differential scanning calorimetry: This utilizes the fact that the liquid-solid phase transition of a swelling agent in a swollen polymeric network is dependent on the crosslinking density. Samples of the respective rubber mixture are swollen with cyclohexane as the swelling agent; to this end the respective sample is extracted with cyclohexane and subsequently left to stand for further swelling at room temperature (RT). The freezing point depression of cyclohexane in the network compared to the macroscopically extended liquid phase is subsequently determined: The preprepared sample is cooled in the measurement apparatus and the heat flux recorded. This results in two freezing peaks, the peak of pure cyclohexane at about 3° C. and a further peak of the cyclohexane present in the swollen sample. The network node spacing is calculated from the temperature difference.

Reversion time: Relative degree of crosslinking of 95% ($t_{REV95}$) after crosslinking and reversion beginning according to ASTM D 5289-12/ISO 6502/DIN 53529 by rotorless vulcameter (MDR=Moving Die Rheometer)

Breaking elongation at room temperature according to DIN 53504-R1 DIN EN ISO 1183-2 DIN ISO 5725. The samples were measured after aging: Aging in each case in air for 14 days at 70° C. or 7 days at 100° C.

Stress cracking resistance (stress cracking lifetime) as number of load changes until breakage of a dumbbell-shaped sample under a constantly repeating extension cycle having a frequency of 104±8 min$^{-1}$, determined with a Monsanto Fatigue to Failure Tester (FTF for Short) at 61% extension and room temperature (RT, 23° C.±2° C.). Upon achieving the maximum number of cycles of 2000 kc (kilocycles) the test is terminated even if the sample has not yet fractured by that time.

b) The samples were measured after aging: Aging performed for 14 days at 70° C./7 days at 100° C. in each case in air.

Tear propagation resistance (hereinbelow referred to synonymously as "Trouser Test") according to DIN ISO 34-1:2004-07, Method A. The test specimen of 2±0.2 mm in thickness, 100 mm in length and 15±0.5 mm in width is centrally parallel to the longitudinal axis and beginning at the transverse side cut/stamped into by 40±5 mm and so to a length of 20 to 25 mm clamped into the upper and lower clamping jaws of a tensile testing machine according to DIN EN ISO 7500-1 supplementary sheet 1:1999-11 having a diagram plotter or computer-controlled data logging in such a way that one half of the cut/stamped region is pulled in one direction and the other half of the cut/stamped region is pulled in the other direction and at an advancing rate of 200 mm/min and at room temperature (RT 23° C.±2° C.) extended until tearing occurs. The maximum required force is recorded. The samples were measured after aging: Aging performed for 14 days at 70° C./7 days at 100° C. in each case in air.

Substances Used a) Vulcuren®: 90% purity, Lanxess.
b) Sulfur OT 33: 66.667% by wt. sulfur, 33.333% by wt. oil In the mixture V3 the same network node spacing as in V1 was established, wherein due to the Vulcuren (sulfur and accelerator radicals incorporated via its moiety) a reduction in the amount of TBBS and sulfur was required.

As is apparent in table 1 the inventive rubber mixture E1 exhibits a markedly better reversion stability and improved cracking properties, in particular after aging, than the comparative mixtures V1 to V4. The features according to the invention interact synergistically as is apparent from the higher values compared to the expected values: the column "erw." lists the values which would result if the measures were to interact only additively.

A vehicle tire comprising at least one rubber mixture, preferably in at least one outer component, exhibits a longer durability, in particular also under warmer usage conditions, and optimized retreadability.

TABLE 1

| Constituents | Units | C1 | C2 | C3 | C4 | E1 | |
|---|---|---|---|---|---|---|---|
| NR | phr | 30 | 30 | 30 | 30 | 30 | |
| BR | phr | 70 | 70 | 70 | 70 | 70 | |
| N339 carbon black | phr | 70 | 70 | 70 | 70 | 70 | |
| Oil | phr | 5.0 | 5.0 | 5.0 | 5.0 | 5.0 | |
| Phenol resin | phr | 5.0 | 5.0 | 5.0 | 5.0 | 5.0 | |
| ZnO | phr | 3.0 | 3.0 | 3.0 | 3.0 | 3.0 | |
| Stearic acid | phr | 2.0 | 2.0 | 2.0 | 2.0 | 2.0 | |
| Antiozonant wax | phr | 2.0 | 2.0 | 2.0 | 2.0 | 2.0 | |
| 6PPD | phr | 2.0 | 2.0 | 2.0 | 3.5 | 3.5 | |
| TMQ | phr | 1.0 | 1.0 | 1.0 | 4.0 | 4.0 | |
| TBBS | phr | 2.5 | 2.5 | 1.9 | 2.5 | 1.9 | |
| Vulcuren® [a] | phr | — | — | 1.0 | — | 1.0 | |
| Sulfur, oil-extended [b] | phr | 3.675 | 1.235 | 2.77 | 3.675 | 0.99 | |
| Resulting sulfur | phr | 2.45 | 0.825 | 1.85 | 2.45 | 0.66 | |
| Network node spacing | nm | 3.5 | 5.5 | 3.5 | 3.9 | 5.5 | |
| Properties | | C1 | C2 | C3 | C4 | E1 | Erw. |
| Reversion time to 95% | min | 12.0 | 17.0 | 16.2 | 10.9 | 29.9 | 20.1 |
| Breaking elongation (after 14 d, 70° C., air) | % | 164 | 277 | 134 | 200 | 327 | 283 |
| Breaking elongation (after 7 d, 100° C., air) | % | 95 | 185 | 93 | 118 | 249 | 206 |
| FTF (after 14 d, 70° C., air) | kc | 67 | 1108 | 128 | 213 | 2000 | 1315 |
| FTF (after 7 d, 100° C., air) | kc | 0.6 | 641.6 | 0.9 | 0.2 | 816.9 | 641.5 |
| Trouser (after 14 d, 70° C., air) | N/mm | 2.5 | 10.4 | 2.4 | 3.5 | 20.2 | 11.3 |
| Trouser (after 7 d, 100° C., air) | N/mm | 1.7 | 4.2 | 1.8 | 2.0 | 5.2 | 4.6 |

The invention claimed is:

1. A sulfur-crosslinked rubber mixture comprising:
   at least one diene rubber,
   0.5 to 10.0 phr of at least one anti-reversion agent, wherein the anti-reversion agent is selected from the group consisting of 1,6-bis(N,N-dibenzylthiocarbamoyldithio)hexane, and hexamethylene-1,6-bis(thiosulfate) disodium salt dihydrate,
2.0 phr or more of at least one para-phenylenediamine,
2.75 phr to 10 phr of at least one dihydroquinoline, and
a vulcanization system having at least one accelerator and elemental sulfur, the at least one accelerator being in an amount of 0.1 to 0.5 mol of accelerator per mol of sulfur atoms,
wherein the network node spacing of the sulfur-crosslinked rubber mixture is from 4.5 to 10 nm, where the network node spacing is determined by differential scanning calorimetry.

2. The sulfur-crosslinked rubber mixture as claimed in claim 1, wherein the para-phenylenediamine is selected from the group consisting of:
N-phenyl-N'-(1,3-dimethylbutyl)-p-phenylenediamine (6PPD),
N,N'-diphenyl-p-phenylenediamine (DPPD),
N,N'-ditolyl-p-phenylenediamine (DTPD),
N-isopropyl-N'-phenyl-p-phenylenediamine (IPPD), phenyl[4-({[4-({[4-(phenylamino)phenyl]amino}ethyl)phenyl]ethyl}amino)phenyl]amine,
phenyl{4-[2-{[4-(phenylamino)phenyl]amino}ethyl)amino]phenyl}amine,
(1-methyl-2-{[-(phenylamino)phenyl]amino}propyl)[4-(phenylamino)phenyl]amine,
N-(1,3-dimethylbutyl)-N'-(4-cumylphenyl)-p-phenylenediamine,
N,N'-di(1,4-dimethylpentyl)-p-phenylenediamine (77PD), N,N'-di(1-ethyl-4-methyl-hexyl)-p-phenylenediamine (88PD), N,N'-bis(1-ethyl-3-methylpentyl)-p-phenylenediamine (DOPD) and N,N'-di-β-naphthyl-p-phenylenediamine (DNPD).

3. The sulfur-crosslinked rubber mixture as claimed in claim 2, wherein the dihydroquinoline is selected from the group consisting of 2,2,4-trimethyl-1,2-dihydroquinoline (TMQ) and 6-ethoxy-2,2,4-trimethyl-1,2-dihydroquinoline (ETMQ).

4. The sulfur-crosslinked rubber mixture as claimed in claim 1, wherein the vulcanization system has 0.01 to 0.14 mol of sulfur atoms per 100 phr of diene rubber (mhr).

5. The sulfur-crosslinked rubber mixture as claimed in claim 4, wherein the vulcanization system has 0.01 to 0.040 mol of sulfur atoms per 100 phr of diene rubber (mhr).

6. The sulfur-crosslinked rubber mixture as claimed in claim 5, wherein the vulcanization system has 0.01 to 0.025 mol of sulfur atoms per 100 phr of diene rubber (mhr).

7. The sulfur-crosslinked rubber mixture as claimed in claim 1, wherein the at least one accelerator is selected from the group consisting of sulfenamide accelerators and guanidine accelerators.

8. The sulfur-crosslinked rubber mixture as claimed in claim 7, wherein the at least one accelerator is at least one sulfenamide accelerator selected from the group consisting of N-cyclohexyl-2-benzothiazolesulfenamide (CBS), N,N-dicyclohexylbenzothiazole-2-sulfenamide (DCBS), benzothiazyl-2-sulfenomorpholide (MBS) and N-tert-butyl-2-benzothiazylsulfenamide (TBBS).

9. The sulfur-crosslinked rubber mixture as claimed in claim 1 further comprising at least one filler of carbon black or silica.

10. The sulfur-crosslinked rubber mixture as claimed in claim 9, wherein the at least one filler is comprised an amount of from 30 phr to 400 phr.

11. The sulfur-crosslinked rubber mixture as claimed in claim 10, wherein the at least one filler is comprised an amount of from 50 phr to 100 phr.

12. The sulfur-crosslinked rubber mixture as claimed in claim 1, wherein the network node spacing of the sulfur-crosslinked rubber mixture is from 5.5 to 10 nm.

13. The sulfur-crosslinked rubber mixture as claimed in claim 1 comprised in at least in one component of a vehicle tire.

14. The sulfur-crosslinked rubber mixture as claimed in claim 13, wherein the at least one component is at least a flange profile, a bead apex, a reinforcing ply, or a tread.

15. The sulfur-crosslinked rubber mixture as claimed in claim 13, wherein the vehicle tire is a runflat tire, and wherein the at least one component is a crescent-shaped reinforcing ply arranged in a sidewall region of the runflat tire.

16. The sulfur-crosslinked rubber mixture as claimed in claim 1, wherein the at least one dihydroquinoline is in a total amount from 3.5 phr to 10 phr, and the para-phenylenediamine is in a total amount from 2 phr to 7 phr.

17. The sulfur-crosslinked rubber mixture as claimed in claim 1, wherein the at least one dihydroquinoline is in a total amount from 3.8 phr to 8 phr.

18. The sulfur-crosslinked rubber mixture as claimed in claim 1, wherein:
the at least one diene rubber includes polybutadiene in a total amount from 50 phr to 80 phr;
the at least one para-phenylenediamine is in a total amount from 3 phr to 7 phr and is selected from the group consisting of N-phenyl-N'-(1,3-dimethylbutyl)-p-phenylenediamine (6PPD) and N,N'-ditolyl-p-phenylenediamine (DTPD);
the at least one dihydroquinoline is in a total amount from 3.8 phr to 8 phr and is selected from the group consisting of 2,2,4-trimethyl-1,2-dihydroquinoline (TMQ) and 6-ethoxy-2,2,4-trimethyl-1,2-dihydroquinoline (ETMQ);
the at least one anti-reversion agent is in a total amount from 0.5 phr to 3 phr, and
the at least one accelerator of the vulcanization system including at least one sulfenamide accelerator in an amount of 0.1 mol to 0.5 mol of the at least one sulfenamide accelerator per mol of sulfur atoms.

19. The sulfur-crosslinked rubber mixture as claimed in claim 18, wherein the at least one sulfenamide accelerator selected from the group consisting of N-cyclohexyl-2-benzothiazolesulfenamide (CBS), N,N-dicyclohexylbenzothiazole-2-sulfenamide (DCBS), benzothiazyl-2-sulfenomorpholide (MBS) and N-tert-butyl-2-benzothiazylsulfenamide (TBBS).

20. The sulfur-crosslinked rubber mixture as claimed in claim 19, wherein the vulcanization system has 0.01 to 0.14 mol of sulfur atoms per 100 phr of diene rubber (mhr).

21. The sulfur-crosslinked rubber mixture as claimed in claim 19, wherein the vulcanization system has 0.01 to 0.040 mol of sulfur atoms per 100 phr of diene rubber (mhr).

22. The sulfur-crosslinked rubber mixture as claimed in claim 20 comprised in at least in one component of a vehicle tire, wherein the at least one anti-reversion agent is 1,6-bis(N,N-dibenzylthiocarbamoyldithio)hexane, the at least one dihydroquinoline is 2,2,4-trimethyl-1,2-dihydroquinoline (TMQ), the at least one sulfenamide accelerator is N-tert-butyl-2-benzothiazylsulfenamide (TBBS), the network node spacing is from 4.5 to 8 nm, and the combination of at least (i) the 1,6-bis(N,N-dibenzylthiocarbamoyldithio)hexane, (ii) the TMQ, and (iii) molar ratio of TBBS to sulfur atoms, in each of their respective amounts, provides a synergistic improvement in at least reversion time to 95%, measured according to ASTM D 5289-12 by MDR, as compared against a same mixture without this combination.

23. The sulfur-crosslinked rubber mixture as claimed in claim 1, wherein the rubber mixture exhibits a reversion time to 95% of greater than 20.1 minutes, as measured according to ASTM D 5289-12 by moving die rheometer (MDR).

24. The sulfur-crosslinked rubber mixture as claimed in claim 23, wherein the rubber mixture exhibits an aged stress cracking resistance of greater than 1315 kilocycles, as measured with a Fatigue to Failure Tester (FTF) at a frequency of 104±8 min-1, a 61% extension, and temperature of 23° C.±2° C., after aging for 14 days in air at 70° C.

* * * * *